United States Patent [19]

Yokoyama et al.

[11] Patent Number: 5,718,497
[45] Date of Patent: Feb. 17, 1998

[54] SURFACE LIGHT SOURCE DEVICE

[75] Inventors: Kazuaki Yokoyama, Saitama-ken; Tsuyoshi Ishikawa, Tokyo-to, both of Japan

[73] Assignee: Enplas Corporation, Kawaguchi, Japan

[21] Appl. No.: 487,674

[22] Filed: Jun. 7, 1995

Related U.S. Application Data

[62] Division of Ser. No. 982,942, Nov. 30, 1992, Pat. No. 5,584,556.

[30] Foreign Application Priority Data

| Nov. 28, 1991 | [JP] | Japan | U.M. 3-105334 |
| Dec. 2, 1991 | [JP] | Japan | 3-341747 |
| Feb. 20, 1992 | [JP] | Japan | U.M. 4-16237 |
| Mar. 25, 1992 | [JP] | Japan | U.M. 4-24601 |
| Mar. 25, 1992 | [JP] | Japan | U.M. 4-24608 |
| Oct. 9, 1992 | [JP] | Japan | 4-296666 |

[51] Int. Cl.⁶ ..... F21V 8/00
[52] U.S. Cl. ..... 362/31; 362/26; 362/327; 362/330; 362/339; 385/901
[58] Field of Search ..... 362/26, 27, 31, 362/327, 330, 331, 333, 339; 359/48, 49, 50; 385/129, 130, 131, 901

[56] References Cited

U.S. PATENT DOCUMENTS

| 2,242,872 | 5/1941 | Rolph | 362/330 |
| 4,373,282 | 2/1983 | Wragg | 40/546 |
| 4,811,507 | 3/1989 | Blachet | 40/546 |
| 5,005,108 | 4/1991 | Pristash et al. | 362/31 |
| 5,040,098 | 8/1991 | Tanaka et al. | 362/31 |
| 5,046,826 | 9/1991 | Iwamoto et al. | 359/49 |
| 5,057,974 | 10/1991 | Mizobe | 362/26 |
| 5,064,276 | 11/1991 | Endo et al. | 359/49 |
| 5,070,431 | 12/1991 | Kitazawa et al. | 362/31 |
| 5,227,773 | 7/1993 | Wu et al. | 340/815.07 |

FOREIGN PATENT DOCUMENTS

| 3-331782 | 3/1991 | Japan . |
| 3-189679 | 8/1991 | Japan . |
| 834837 | 3/1952 | United Kingdom . |

*Primary Examiner*—Alan Cariaso
*Attorney, Agent, or Firm*—Cushman, Darby & Cushman IP Group of Pillsbury Madison & Sutro LLP

[57] ABSTRACT

A surface light source device which comprises a light-conducting member consisting of a sheet of transparent material, a linear light source disposed adjacent to an edge surface of the light-conducting member, a diffusion plate disposed on a front surface of the light-conducting member and a reflective plate disposed on a rear side of the light-conducting member. The rear surface of the light-conducting member has depressions or projections. These depressions or projections have rough surfaces. By selecting the shape of the depressions or projections, and controlling the roughness of the rough surfaces, an enhanced uniform brightness distribution is provided.

16 Claims, 9 Drawing Sheets

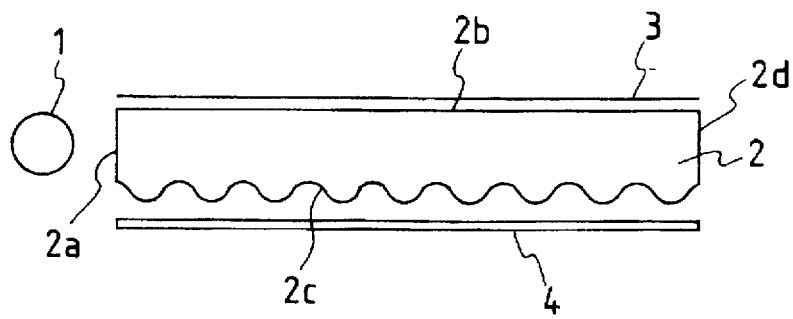
FIG. 19
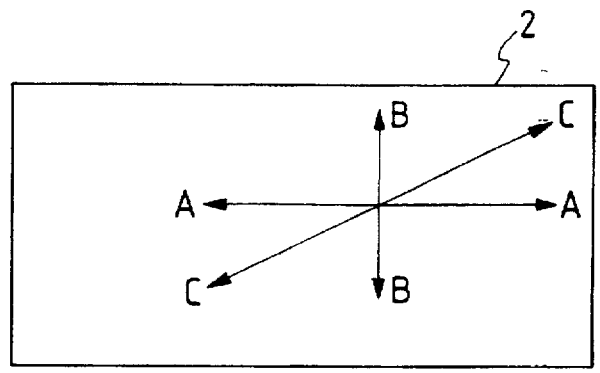
FIG. 20
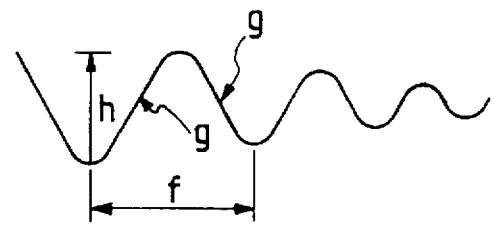
FIG. 21
FIG. 22
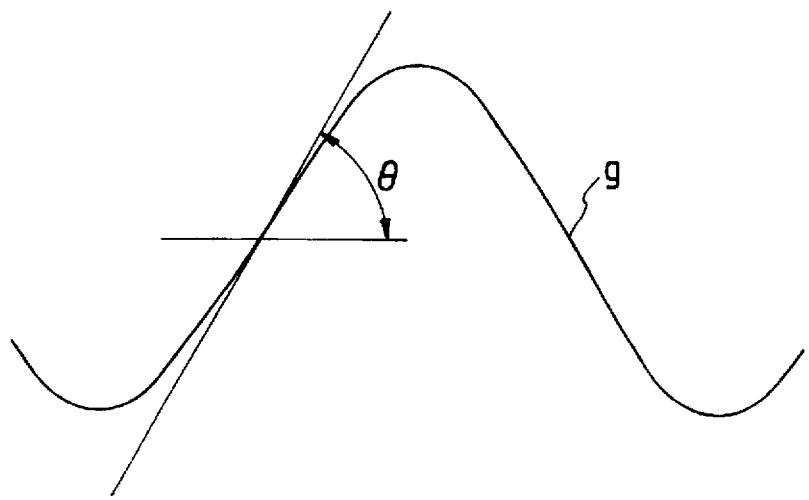

SURFACE LIGHT SOURCE DEVICE

This is a division of application Ser. No. 07/982,942, filed Nov. 30, 1992, now U.S. Pat. No. 5,584,556.

BACKGROUND OF THE INVENTION

1. Field of the Invention

This invention relates to a surface light source device to be used as a backlight for a liquid crystal display unit.

2. Description of the Prior Art

FIG. 1 shows a conventional surface light source device that has a light-conducting member. This device comprises a linear light source 1, such as a cold-cathode fluorescent tube, a light-conducting member 2 that has an edge surface of incidence 2a disposed adjacent the light source 1, a diffusion plate 3 that is located on or adjacent a front surface 2b (a top surface in FIG. 1) of the light-conducting member 2, and a reflective surface that is disposed adjacent a rear surface 2c (a lower surface in FIG. 1) of the light conducting member 2. In this surface light source device, an incident light from the source 1 is directed toward the edge surface of incidence 2a of the light-conducting member 2. The light-conducting member 2 conducts the light toward a rearward edge surface 2d by total internal reflection from the surfaces 2b and 2c.

In the conventional device, however, the surface 2c of the light-conducting member 2 is provided with either a roughened surface or spots 2e formed by painting to scatter part of the conducted light, in such a way that part of the light, while travelling toward the surface 2d, spreads out from the surface 2b without being reflected by the surface. Thus, in the surface light source device of FIG. 1, when the rear surface 2c of the light-conducting member 2 has a rough surface or forms an array of spots 2e, as shown in FIG. 1, so that, while the incident light from the source 1 is advanced passing through the light-conducting member 2, part of this light spreads out from the surface 2b and then passes through the diffusion plate 3 to form a diffused light, which is available for use as a surface light source.

In this surface light source device, it is necessary to ensure that the diffused light that has passed through the diffusion plate 3 should appear uniformly over an entire surface of the diffusion plate 3.

Also, because this surface light source device can be used, for example, as a back-light of a liquid crystal display, this requires the diffused light to be bright enough for such an application. Thus, the surface light source device is provided with means to increase the brightness.

Typical surface light source devices of the prior art that have means to increase the brightness, are disclosed in Japanese Patent Kokai Publication No. 3-189679A and Japanese Utility Kokai Publication No. 3-31782A. Like the device of FIG. 1, each of these devices comprises a light source, a light-conducting member, a diffusion plate and a reflective plate. The surface 2c of the light-conducting member 2, which is opposite to the front or emitting surface 2b, i.e. the surface 2c adjacent to the reflective surface 4, forms a large number of minute pyramids which are arranged concavely or convexly to increase the brightness on the diffusion plate. Various sizes of these pyramids are arranged according to the area chosen to produce a uniform brightness distribution.

These prior art devices, however, have a problem in that, although it is possible to increase the brightness if the pyramid has a relatively large surface area, it is difficult to produce a uniform brightness distribution on the diffusion plate 3. Also, the pyramid formed on the light-conducting member has a disadvantage in that the light will shine at their corners.

SUMMARY OF THE INVENTION

An object of this invention is to provide a surface light source device comprising a planar light-conducting member of transparent material, a linear light source which is located adjacent at least one edge surface of the light-conducting member, a diffusion plate located on the front surface of the light-conducting member, and a reflective surface disposed on or adjacent the rear surface of the light-conducting member, characterized that the rear surface of the light-conducting member has a multiplicity of minute projections or depressions formed thereon and that these projections-or depressions have rought surfaces.

The rough surface has a multiplicity of microscopic projections and depressions, and resembles the face of a sand-paper in a configuration. The light reflected by, or transmitted through, the rough surface is scattered as a diffused light. The greater the roughness of the rough surface is, the greater the extent of the diffusion of the scattered light is. The fact that the roughness is great means that, in considering the depth and the width of both the microscopic projection and depression, and the pitch of the projections and depressions in their vertical cross-section, when both the width and the pitch are constant, the depth is great, when both the depth and the pitch are constant, the width is great, and when both the depth and the width are constant, the pitch is small.

Another object of this invention is to provide a surface light source device wherein various shapes and sizes of minute projections or depressions are formed on the rear surface of the light-conducting member, each of these projections or depressions having a rough surface.

A still another object of this invention is to provide a surface light source device wherein the rear surface of the light-conducting member has continuous corrugations, each of these corrugations having a rough surface.

BRIEF DESCRIPTION OF THE DRAWINGS

FIG. 19 is a sectional view of an eighth embodiment of this invention.

FIG. 20 is a view of the light-conducting member as viewed from its top (from its light-emitting side).

FIGS. 21 and 22 are views of the curves of corrugations in the light-conducting member used in the eighth embodiment of this invention.

DETAILED DESCRIPTION OF THE PREFERRED EMBODIMENTS

Figure 1:
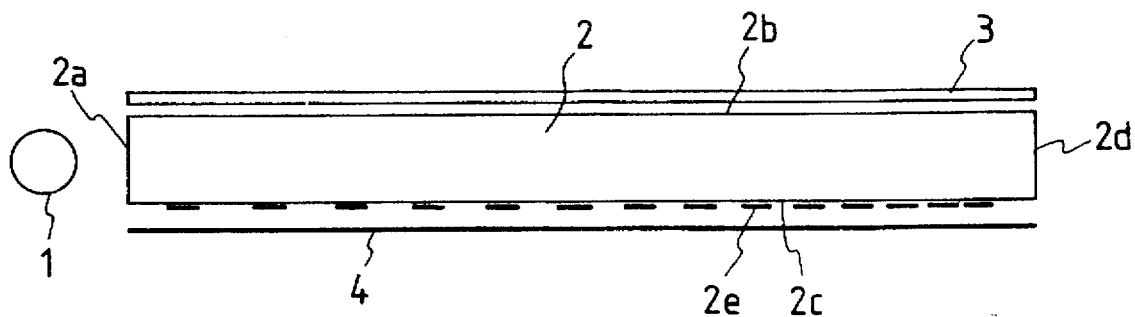
FIG. 1 is a sectional view of a surface light source device of the prior art.
Figure 2:
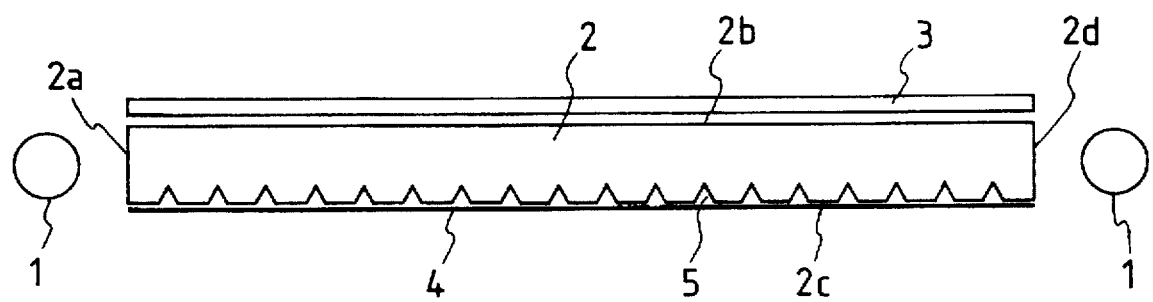
FIG. 2 is a sectional view of a first embodiment of this invention.

FIG. 2 is a sectional view of a first embodiment of a surface light source device of this invention. The device of FIG. 1 comprises a light source 1, a light-conducting member 2, a diffusion plate 3 and a reflective plate 4. A pair of the light source 1 are located adjacent to both ends 2a, 2d of the light-conducting member 2. A surface 2c of the light-conducting member 2, which is opposite to an emitting surface 2b, has a multiplicity of small depressions 5 formed thereon. Each of these depression a has a rough surface.

In this first embodiment, because the surface 2c of the light-conducting member 2 has a large number of depressions 5, the direction of total reflection from the surface 2c will be altered by the depressions 5. Thus, if the size, shape and position of the depression 5 is appropriately selected, it is possible to produce a relatively uniform brightness distribution on the diffusion plate 3. Further, due to the rough surface 11 formed on the depression 5, it is possible to make more uniform the brightness distribution.

Figure 3:
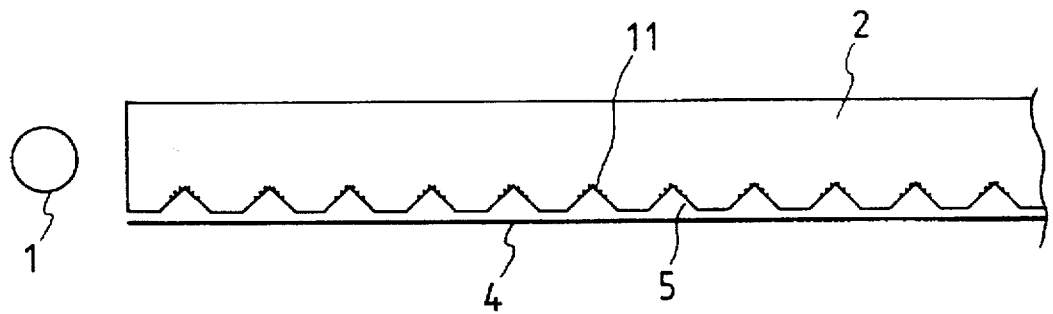
FIG. 3 is an enlarged section view of a light-conducting member used in the first embodiment.

FIG. 3 is an enlarged view of a light-conducting member 2 for use in the first embodiment. This light-conducting member 2 has a number of conical-, or pyramidal-shaped depressions 5 formed thereon. If a multiplicity of conical or pyramidal depressions are formed and their size, shape and position is appropriately selected, it is possible to provide a uniform brightness distribution on the surface light source device.

As shown in FIG. 2, this embodiment has a pair of light sources. However, if four units of light sources are used, one each on the surface 2b on four sides of the square-, or rectangular-shaped light-conducting member 2, it is possible to enhance the brightness of a surface light source device. Alternatively, only one light source may be adequate for a certain need.

In this first embodiment, by increasing the number of light sources used and providing a light-conducting member with depressions, it is possible to provide a bright surface light source device. Also, by appropriately selecting the size etc. of the depressions, it is possible to produce a uniform brightness distribution.

This embodiment has a disadvantage in that, as the depressions of the light-conducting member 2 have conical or pyramidal shape, only their apex or corners etc. will appear recognizably bright with emitted light.

Throughout this embodiment as well as other embodiments that will be described hereafter, this invention has a major feature in providing depressions on the rear surface of the light-conducting member 2, as well as in the shapes etc. of these depressions. Thus, to enable clear understanding, these depressions and their shapes are shown in expanded form in the drawings. In practice, however, the depression or projection has a size of about 0.1 to 1 mm.

Figure 4:
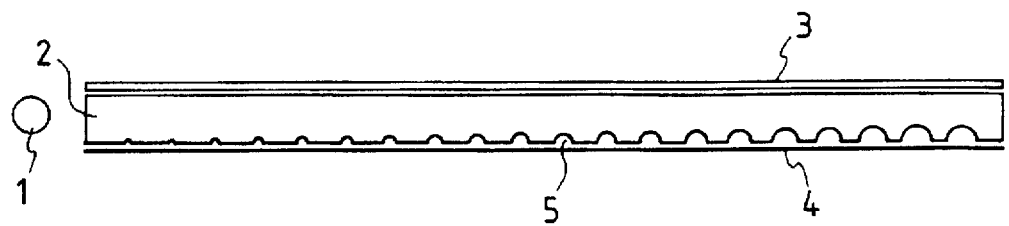
FIG. 4 is a section view of a second embodiment of this invention.
Figure 5:
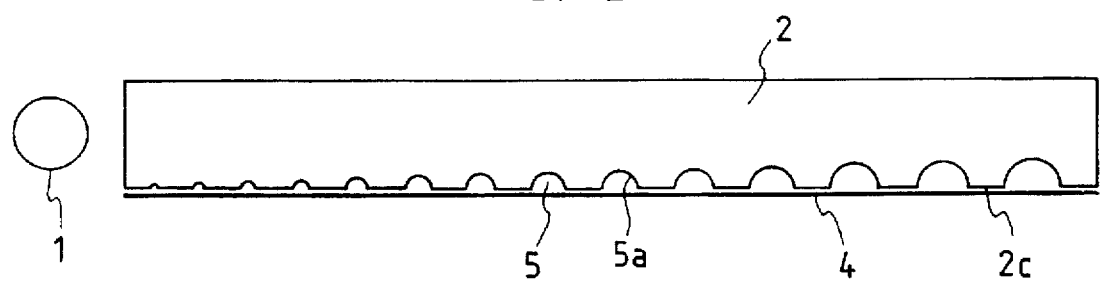
FIG. 5 is an enlarged section view of a light-conducting member used in the second embodiment.

FIG. 4 is a sectional view of a second embodiment of this invention. This embodiment has a light source 1, a light-conducting member 2, a diffusion plate 3 and a reflective plate 4, in the same configuration as that of the surface light source device of FIG. 2. In this second embodiment, however, as shown in FIG. 5, a surface 2c has hemispherical depressions 5 formed thereon. These depressions 5 are formed in a pattern such that the radius of curvature becomes the smallest for those which are located close to the light source 1 and gradually increases along the length of the surface 2c. In this way, by providing a multiplicity of hemispherical depressions that have differences in the radius of curvature, it is possible to make uniform a brightness distribution on the diffusion plate 3, as can be achieved in the first embodiment. Also, the problem of a local shining can be overcome as hemispherical depressions are provided.

In this embodiment, depressions on the surface 2c may be formed in a pattern such that they will have the increased depth along its length as they lie farther from the light source 1, with the most shallow ones close to the light source 1.

Figure 6:
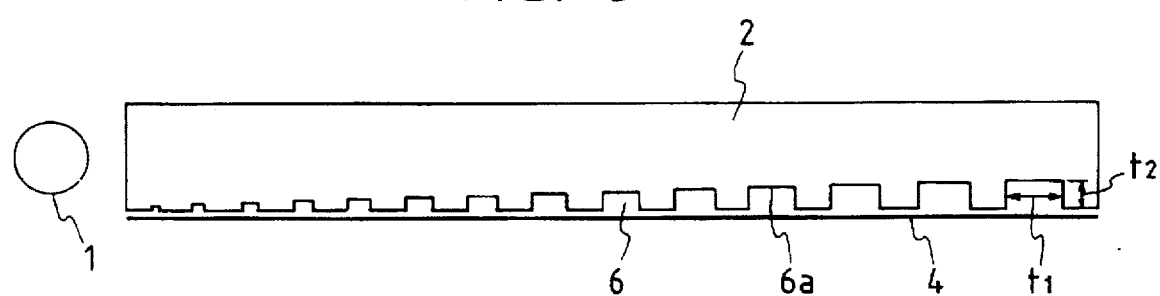
FIG. 6 is an enlarged section view of a light-conducting member used in a third embodiment of this invention.

FIG. 6 is an enlarged sectional view of a third embodiment of this invention wherein a light-conducting member 2 has differently shaped depressions 6, which are of cylinderical form. The depressions 6 have the increased dimensions as they lie farther apart from the light source 1.

In this embodiment, while FIG. 6 shows depressions 6 having a change in the length $t_1$ as well as depth $t_2$, it is possible to achieve the same effect by changing either the length $t_1$ or the depth $t_2$ alone.

Figure 7:
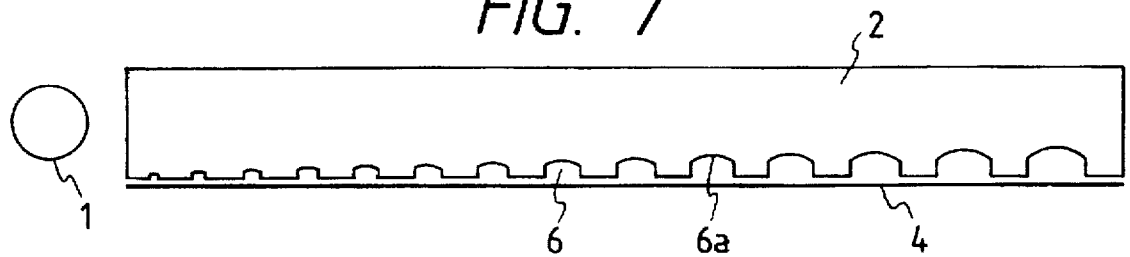
FIG. 7 is a sectional view of a variation of a light-conducting member used in the third embodiment.

FIG. 7 is a sectional view of a variation of the third embodiment of the light-conducting member, shown in FIG. 6, wherein the light-conducting member 2 has depressions of cylindrical form, whose innermost surface 6a is spherical.

Figure 8:
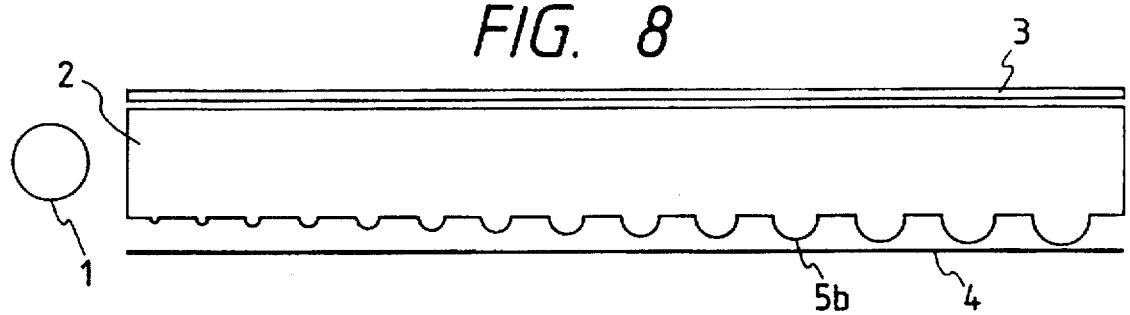
FIG. 8 through FIG. 10 are views of variants of a light-conducting member shown in FIG. 5 through FIG. 7, respectively.
Figure 9:
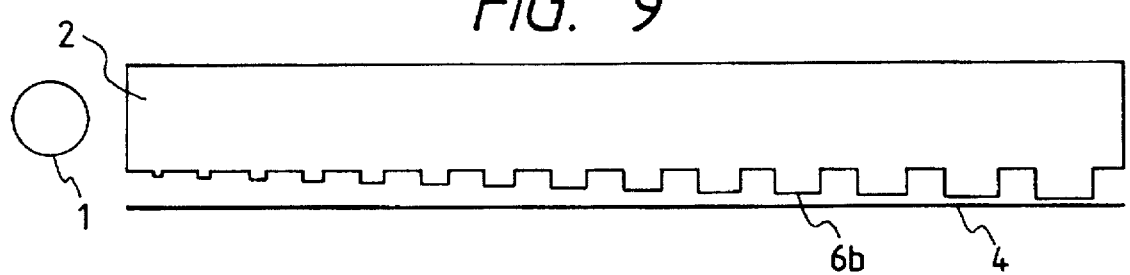
Figure 10:
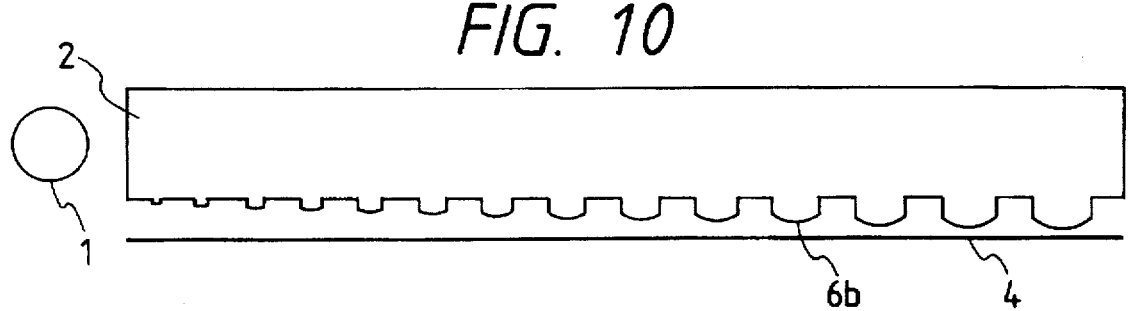

Also, as shown in FIGS. 8, 9 and 10, a surface 2c of the light-conducting member 2 may have projections in place of depressions. These projections may be spherical, as shown in FIG. 8, or cylindrical, as shown in FIGS. 9 and 10. These projections have the increased dimensions as they lie farther from the light source 1.

In this third embodiment, to make more uniform the brightness distribution on the diffusion plate 3, the projections or depressions of the light-conducting member 2 should preferably have rough surfaces on their surfaces 5a, 6a, 5b, 6b, respectively. Further, the roughness of the surfaces should preferably become greater as they lie farther from the light source 1.

Figure 11:
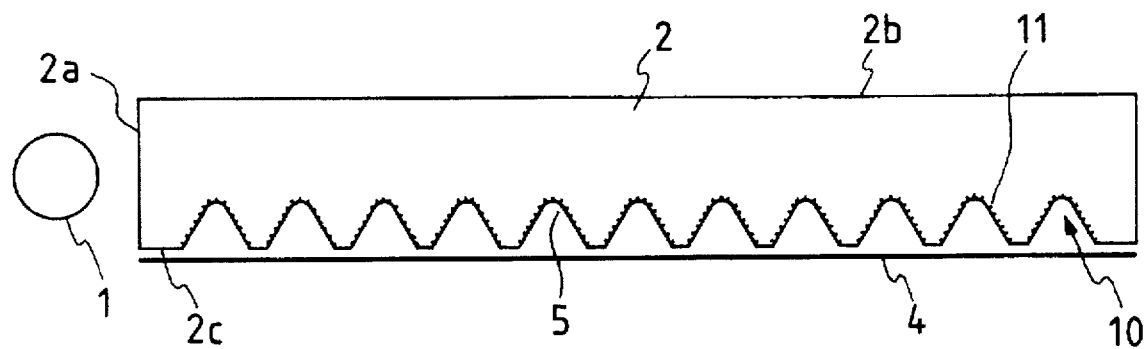
FIG. 11 is an enlarged section view of a light-conducting member used in a fourth embodiment of this invention.
Figure 12:
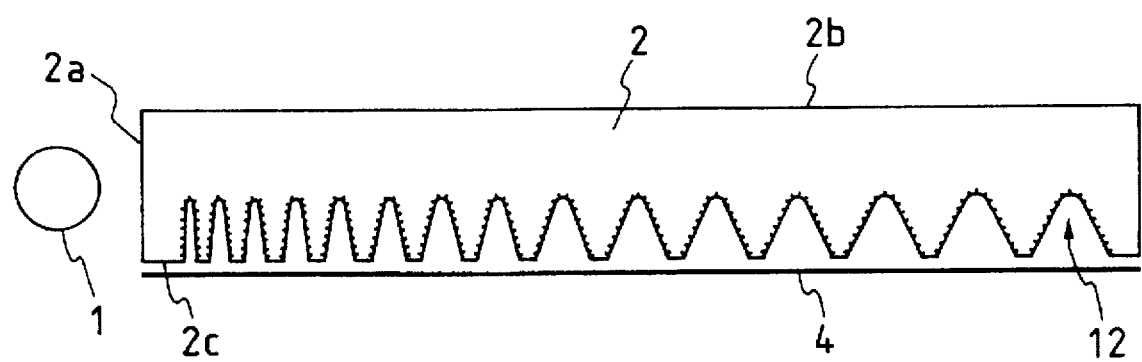
FIG. 12 is an enlarged section view of a light-conducting member used in a fifth embodiment of this invention.
Figure 13:
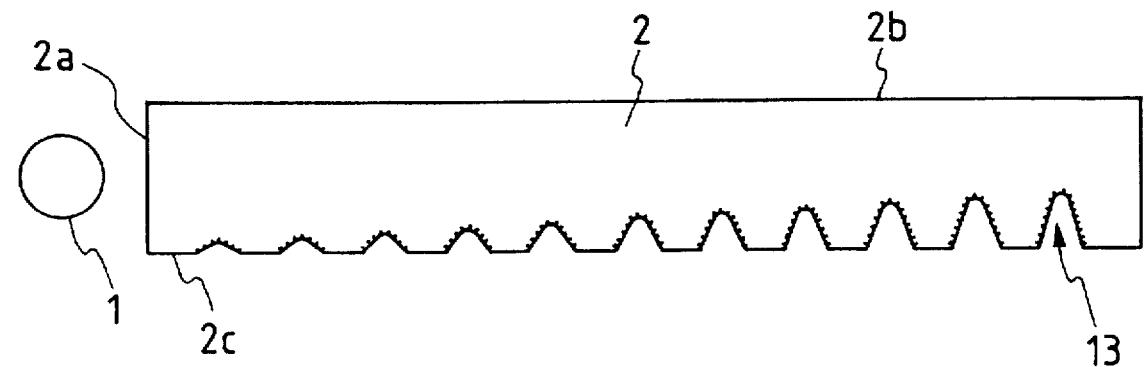
FIG. 13 is an enlarged section view of a light-conducting member used in a sixth embodiment of this invention.

FIGS. 11 through 13 are enlarged views of a light-conducting member for use in a fourth embodiment of this invention. In the first, second and third embodiments, the depressions used therein are of conical, pyramidal, or hemispherical form, etc. By contrast, the depressions shown in FIGS. 11 to 13 may be of any shape consisting of curves, and each of the depressions has a rough surface. Further, in FIGS. 12 and 13, the depressions have various sizes and depths. These depressions have different degrees of roughness. Thus, it is possible to cause the light to be uniformly emitted from the entire surface 2b.

In the fourth embodiment of FIG. 11, a surface 2c of the light-conducting member 2 has depressions of the same shape and size that are equally spaced. This embodiment has a depression 10 with a rough surface 11 formed thereon. Due to the distribution of these rough surfaces 11, the light emitted from the surface 2b becomes uniform throughout the surface 2b, thereby providing a uniform brightness distribution of a diffuse light that has passed through the diffusion plate 3. More particularly, the roughness of the surfaces 11 becomes greater as they lie farther from an edge surface of incidence 2a.

In this fourth embodiment of FIG. 11, because the surface 2c of the light-conducting member 2 has a multiplicity of depressions 10, the light that is incident on the edge 2a is reflected from the depressions 10 and then emitted from the emitting surface 2b. The emitted light passes through the diffusion plate. 3 to form a diffuse light. The light that is incident on the surface 2a, but that is transmitted through the depressions 10 is reflected from the reflective plate 4 and re-enter into the light-conducting member 2. The reflected light is then emitted from the emitting surface 2b and passes through the diffusion plate 3 to form a diffuse light. In this case, the light emitted from the light-conducting member 2 tends to have the declining intensity with respect to its areas lying farther from the edge surface of incidence 2a. In this fourth embodiment having a distribution of depressions mentioned above, it is possible to provide a uniform brightness distribution.

FIG. 12 is a sectional view of a fifth embodiment of a light-conducting member for use in this invention, wherein depressions 12 have different sizes in different areas. More particularly, while having the same depth, the depressions 10 have the increased width as they lie farther from the edge surface of incidence. Due to the distribution of depressions as noted above, this embodiment provides a substantially uniform brightness distribution. In this embodiment, each of the depressions have substantially the same roughness.

FIG. 13 is a sectional view of a sixth embodiment of a light-conducting member for use in this invention, wherein the light-conducting member 2 has depressions 13 with different depths in different areas. More particularly, depressions 13 have the increased depths as they lie farther from the edge surface of incidence. In this way, as with the light-conducting member of FIG. 12, it is possible to cause the light to be uniformly emitted from the entire emitting surface 2b.

Figure 14:
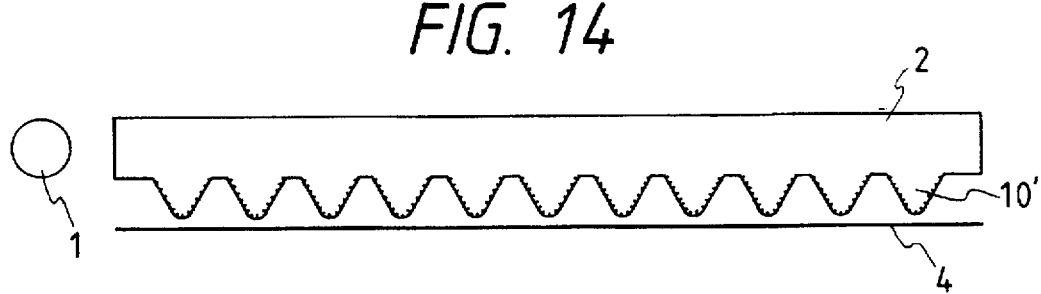
FIG. 14 through FIG. 16 are views of variants of a light-conducting member shown in FIG. 11 through FIG. 13, respectively.
Figure 15:
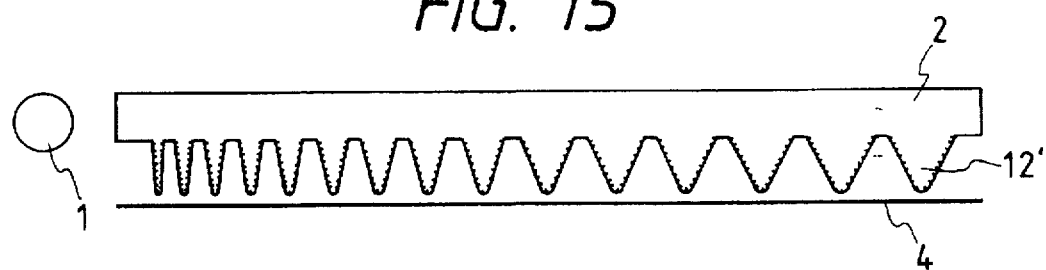
Figure 16:
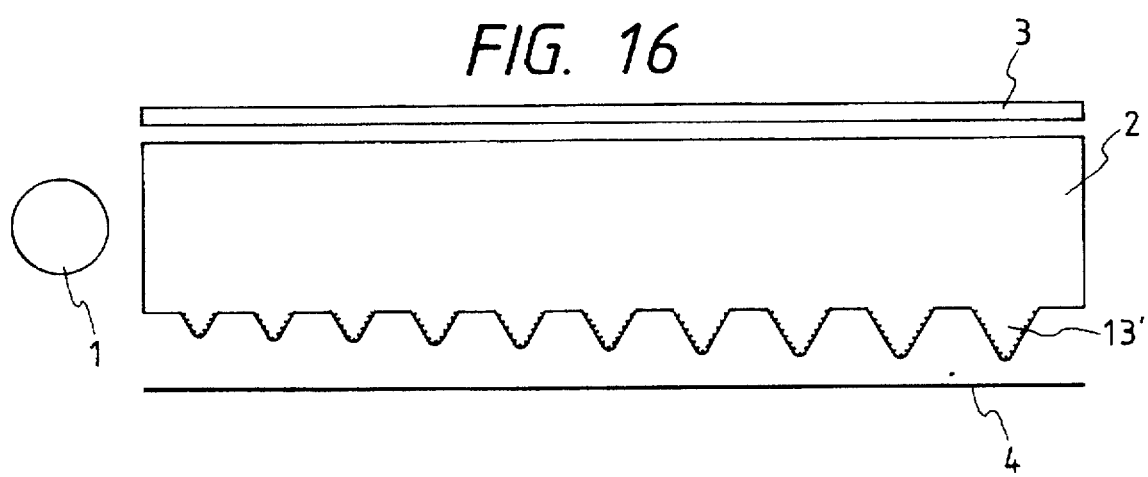

FIGS. 14, 15 and 16 are views of variants of the light-conducting member 2 of FIGS. 11, 12 and 13, wherein depressions 10, 12 and 13 are replaced by projections 10', 12' and 13' respectively The light-conducting member 2 of FIG. 14 has each of projections of the same size and shape. Also, the protrusions have different roughness in different areas, as in FIG. 11. By contrast, the light-conducting member of FIGS. 15 and 16 have projections 12' or 13' of different sizes in different areas.

In the above-mentioned embodiments, it must be noted that the surface 2c of the light-conducting member 2 has depressions or projections each of which is symmetrical with respect to its vertical center line.

Figure 17:
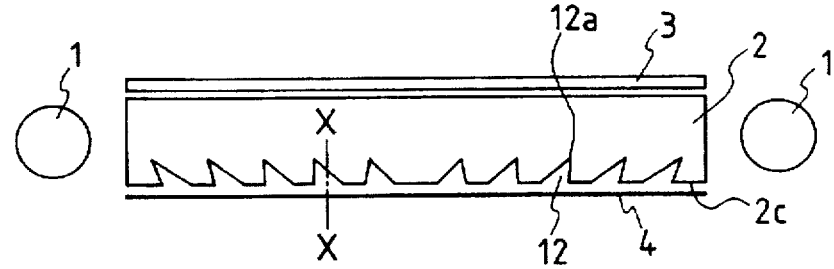
FIG. 17 is a sectional view of a seventh embodiment of this invention.

FIG. 17 is a sectional view of a seventh embodiment of a light-conducting member, wherein the light-conducting member 2 has depressions 12 of asymmetrical form about the x—x line. This embodiment is accomplished in such a way that conical or pyramidal depressions of the light-conducting member 2 in the first embodiment of FIG. 3 are replaced by those of asymmetrical form. Alternatively, conical or pyramidal projections may be replaced by those of asymmetrical form. Further, regarding the light-conducting member of FIGS. 11 through 13, symmetrical depressions may be replaced by those of asymmetrical form. Also, regarding the light-conducting member of FIGS. 15, 16 and 17, projections shown therein may be replaced by those of asymmetrical form.

Figure 18:
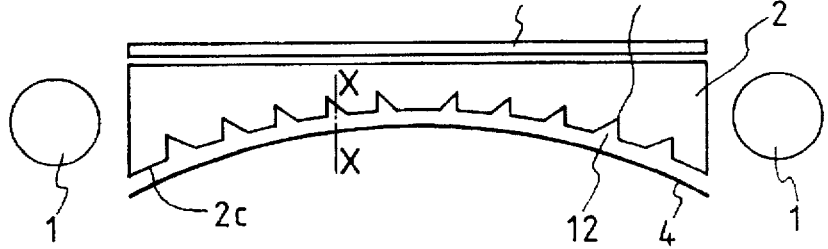
FIG. 18 is a view of a variation of the seventh embodiment of this invention.

FIG. 18 is a view of a variant of the light-conducting member of FIG. 17, wherein a surface 2c of the light-conducting member is of curved form. In the embodiments of FIGS. 17 and 18, the apexes 12a of the depressions 12 should preferably have curved surfaces.

In the first through seventh embodiments, noted above, the rough surfaces 11 are formed only on depressions or projections of the light-conducting member 2. However, the rough surfaces may be formed in portions between depressions or projections.

FIG. 19 is a view of an eighth embodiment of a light-conducting member. In this embodiment, a surface 2c of the light-conducting member 2 has smooth, continuous corrugations in all the directions along its surface. FIG. 19 is a sectional view of the light-conducting member taken in a direction of the arrow A—A of FIG. 20, which is a plan view of the member as viewed from its top. The section of the surface 2c in a direction of an arrow B—B, which is at right angles to the direction of the arrow A—A, is also of corrugation. Further, the section of the surface 2c in an oblique direction of the arrow C—C, set at an angle to the directions of the arrows A—A and B—B, has also a corrugated one.

In this eighth embodiment, the light that is directed onto the incidence surface 2a of the light-conducting member 2 is totally reflected from the surfaces 2b and 2c as it travels toward the surface 2d. While traveling toward the surface 2d, the light is totally reflected in different directions by the provision of corrugations. Also, part of the light is refracted by, and transmitted through, the corrugations.

The transmitted light is reflected by the reflective plate 4 and, after having been refracted by the corrugations, it re-enters into the light-conducting member 2 passing through the corrugations. Thus, a diffused light, i.e., the light that has emitted through the surface 2b and then passed through the diffusion plate 3 will appear substantially uniform and in large amounts on the diffusion plate 3. The diffused light thus obtained is so uniform that there occurs no bright spots at all.

In this embodiment, to provide a more uniform light on the diffusion plate 3, it will be effective that the corrugations have rough surfaces.

In this embodiment, there occurs no bright spots at all because the surface 2c of the light-conducting member 2 has continuous corrugations in all directions, as noted above. Further, it is relatively easy to provide rough surfaces for the corrugations.

Corrugations of FIG. 19 may be changed with respect to their size and shape etc. FIGS. 21 and 22 are views of the corrugation shape. The corrugation shape of FIG. 21 may be altered with respect to its various dimensions, such as height h, spacing between adjacent corrugations f, and incline of slope g, that is, angle θ of FIG. 22.

FIGS. 23 through 27 are views of variants of a light-conducting member for use in an eighth embodiemnt of this invention, wherein corrugations of different sizes and shapes etc. are provided in different locations.

Figure 23:
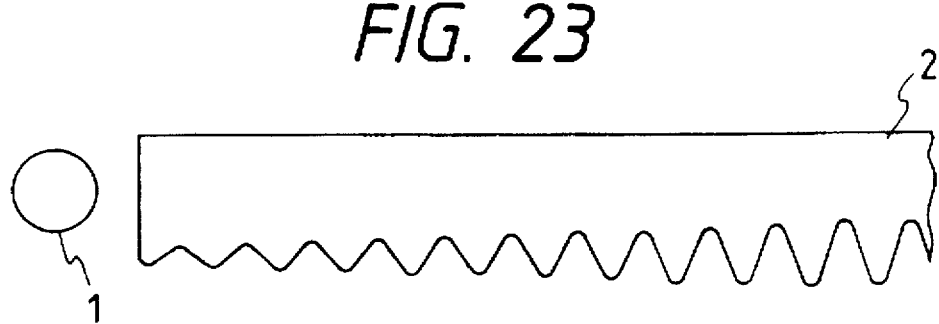
FIG. 23 through FIG. 29 are views of variants of the light-conducting member used in the eighth embodiment of this invention, respectively.

The light-conducting member 2 of FIG. 23 has corrugations with an increased height as they lie farther from the light source. Thus, a light is uniformly emitted through the surface 2b of the light-conducting member 2.

Figure 24:
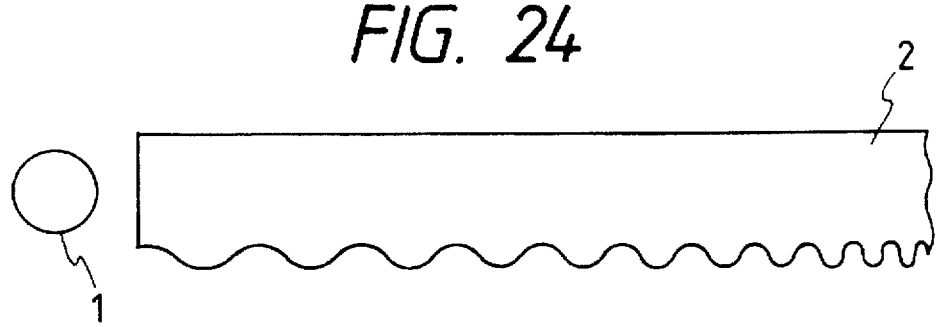

In the light-conducting member 2 of FIG. 24, the surface 2c has corrugations with an decreased spacing between adjacent corrugations as they lie farther from the light source. Thus, as in FIG. 23, a light is allowed to be uniformly emitted through the surface 2b of the light-conducting member 2.

Figure 25:
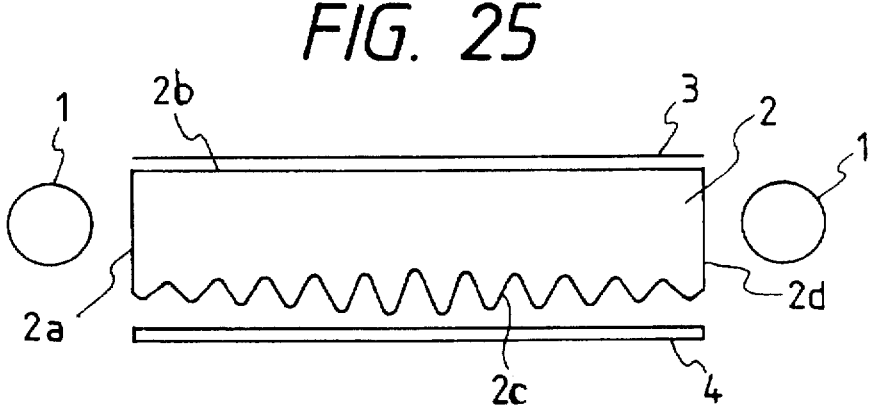

The light-conducting member 2 of FIG. 25 is intended for use in a surface light source device wherein a pair of light sources 1 are placed adjacent both edge surfaces 2a and 2d of the light-conducting member 2. The surface 2c of the light-conducting member 2 has corrugations in such a way that their height at both edge surfaces 2a and 2d, is the lowest and it is the highest at the center of the light-conducting member 2.

Figure 26:
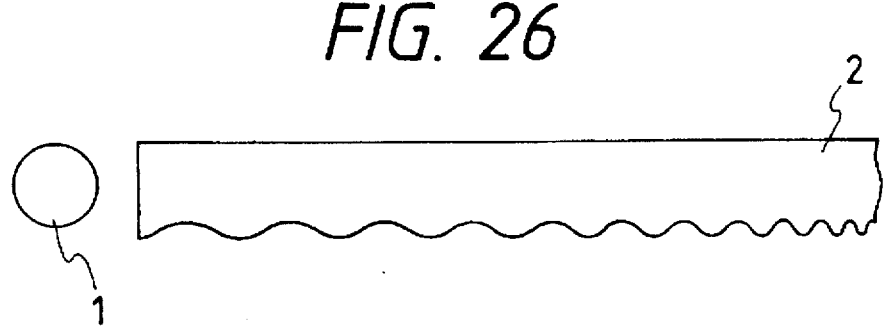

In the light-conducting member 2 of FIG. 26, the surface 2c has corrugations with an increased angle θ of the slope g as they lie farther from the light source. The angle θ at the edge surface 2d is 45° to 60°.

Figure 27:
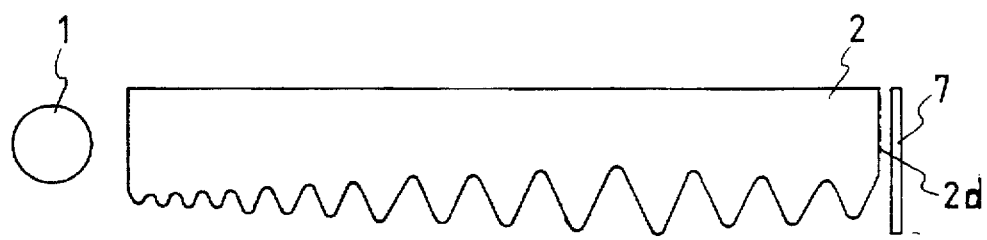

The light-conducting member 2 of FIG. 27 has an edge surface 2d opposite to an edge surface of incidence 2a, and the edge surface acts as a reflective surface. The light that is directed onto the edge surface 2a is reflected back from the opposite edge surface 2d after having reaching it. The light will not escape through the edge surface 2d. As a result, the region adjacent to a reflective plate 7 shines brightly and thus it is impossible to provide a uniform brightness distribution. To provide a uniform brightness, the light-conducting member 2 of FIG. 27 has a surface 2c formed with corrugations in such way that their height is the lowest for those close to the edge surface 2a and it becomes gradually higher as they lie farther away from the edge surface 2a, and then their height becomes lower toward the edge surface 2d.

Figure 28:
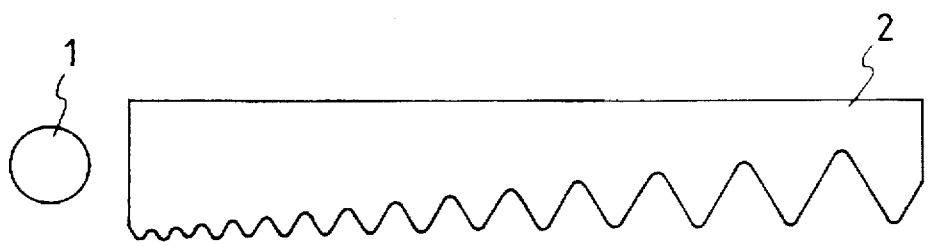

The light-conducting member 2 of FIG. 28 is tapered in thickness. It has a thickest portion close to the light source and has an decreased thickness along its length. The tapered surface 2c has corrugations.

Figure 29:
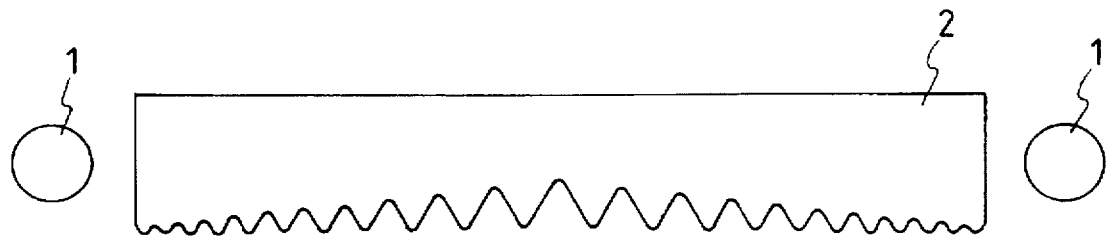

The light-conducting member 2 of FIG. 29 is tapered in thickness toward its center where it has a thinnest portion. A pair of light sources are positioned adjacent opposite edge surfaces of the light-conducting member 2. A lower surface 2c has corrugations.

In the light-conducting member of FIGS. 23 to 29, noted above, it is possible to provide the corrugations with rough surfaces.

Now, description will be made on means to form rough surfaces on a surface 2c of the light-conducting member in the first through eighth embodiments. The light-conducting member is generally made of transparent synthetic resins. Thus, a mold used in molding the light-conducting member of synthetic resins should have rough surfaces.

Figure 31:
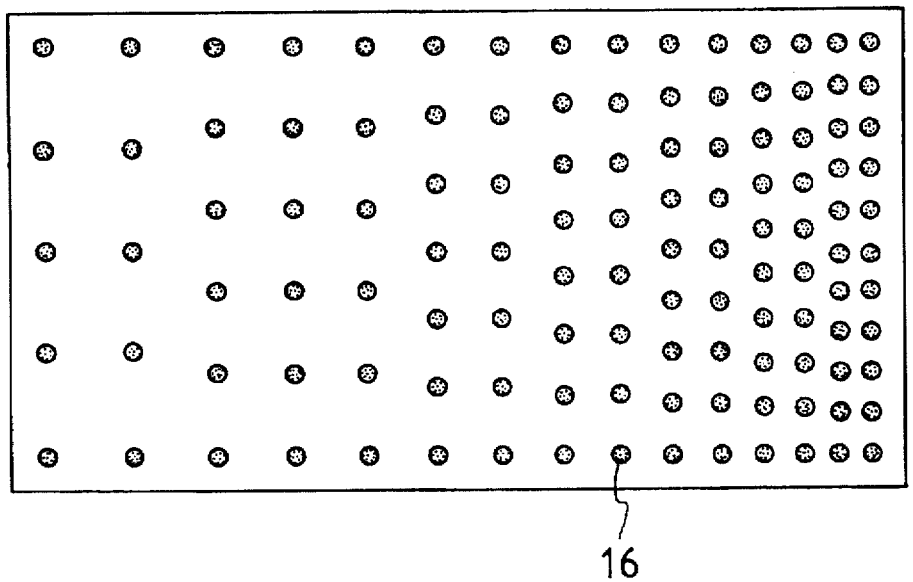
FIG. 31 is a view of a pattern of rough surfaces.

To form rough surfaces on the mold, an electric-discharge machining (a spark erosion process) may be used for this invention. As a typical example, a light-conducting member 2 requires to have a pattern with a multiplicity of tiny spots 16, as shown in FIG. 31. The mold is prepared by a spark erosion process to form a corresponding pattern of spots.

Figure 30:
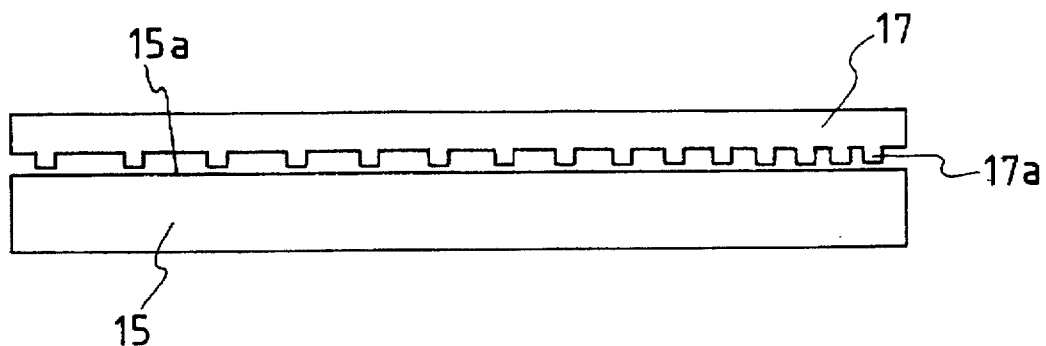
FIG. 30 is a view showing the configuration of a metal mold with rough surfaces that is used to form a light-conducting member having corresponding rough surfaces.

In this process, as shown in FIG. 30, an electrode 17 is maintained very close to a mold 15. The electrode 17 of male form has a large number of projections 17a that correspond to tiny spots 16 in FIG. 31. As shown in FIG. 30, the mold 15 and electrode 17 are positioned in opposed relation. The mold 15 is made to act as the other electrode so that the electric-spark machining is carried out. In this way, a surface 15a of the mold 15 which is placed very close to the electrode 17 will be machined in areas facing the projections 17a of the electrode 17 to form a desired pattern of the roughness on the rough surfaces. Typically, the electric-spark machining is made with the current of 3–7 A, and at a pulse duration of 5–20 microseconds. By changing the operating conditions of the electric-spark machining process, it is possible to provide different patterns of the roughness on the rough surfaces.

When a multiplicity of dots are formed on the projections or depressions of the rear surface 2c of the light conductive member 2 by printing in place of providing the rough surface on them, the extent of the diffusion of the scattered light is substantially the same as in the later ease. The fact that a number of the dots per unit area is great corresponds to that the roughness of the rough surface is great.

We claim:

1. A surface light source device comprising:

a light conducting member having i) a light emitting surface on one side thereof, ii) a surface opposite said light emitting surface on a side opposite said one side, thereof, and iii) an edge surface;

a reflective surface adjacent said opposite surface; and a linear light source disposed adjacent to said edge surface of said light conducting member, said opposite surface of said light conducting member including smooth surface portions and a plurality of projections projecting outwardly from said smooth surface portions, said projections providing rough surface portions which are rough in comparison to said smooth surface portions.

2. The surface light source device of claim 1 wherein said projections have a hemispherical shape.

3. The surface light source device of claim 1 wherein said projections have a cylindrical shape.

4. The surface light source device of claim 1 wherein said projections have a curved shape.

5. The surface light source device of any of claims 2, 3 and 4 wherein said projections have an increased size as said projects lie farther from said edge surface with the smallest projections lying adjacent to said edge surface.

6. The surface light source device of claim 1 wherein said projections are identically shaped and sized and equally spaced with respect to one another, and wherein said said rough surface portions of said projections become rougher as they lie farther from said edge surface.

7. The surface light source device of claim 1 wherein said projections have an identical diameter, and wherein said projections are distributed in such a manner that the density thereof becomes greater as said projections lie farther from said edge surface.

8. The surface light source device of claim 1 wherein said projections have an increased diameter along a length of said light conducting member, and wherein the projections of the smallest diameter lie adjacent to said edge surface of incidence.

9. A surface light source device comprising:

a linear light source;

a light-conducting member having i) a light emitting surface disposed on one side thereof, ii) a surface opposite said light emitting surface on a side opposite said one side, thereof, and iii) an edge surface disposed adjacent to said light source; and a reflective surface disposed adjacent to said opposite surface said device comprising corrugations formed on said opposite surface of said light-conducting member, said corrugations being defined by alternating crests and bases on said opposite surface of said light-conducting member, wherein surface portions intermediate said crests and said bases generally extend from said bases toward said crests at an angle of less than 45° with respect to the horizontal at areas adjacent said edge surface, and wherein said angle increases to within 45°–60° at areas disposed further away from said edge surface than said areas adjacent said edge surface.

10. A surface light source device comprising: a linear light source;

a light-conducting member having one edge disposed adjacent to said light source and an opposite edge, a light emitting surface disposed on one side of the light conducting member, and an opposite surface disposed on a side of said light-conducting member opposite said one side; and a reflective surface adjacent said opposite surface of said light-conducting member;

said device comprising corrugations formed on said opposite surface of said light-conducting member, said corrugations being defined by a waveform of alternating crests and bases on said opposite surface of said light-conducting member, wherein an angle of inclination between any particular base and crest of said waveform relative to the horizontal increase as said waveform approaches said opposite edge, and is between 45° to 60° at said opposite edge.

11. A surface light source device comprising:

a light conducting member having a light-emitting surface disposed on one side thereof, an opposite surface disposed on a side opposite said one side, thereof, and an edge surface; and a linear light source disposed adjacent to said edge surface of said light conducting member, wherein said opposite surface of the light conducting member includes smooth surface portions and a plurality of depressed regions depressed inwardly relative to said smooth surface portions, said depressed regions providing rough surface portions which are rough in comparison with said smooth surface portions.

12. The surface light source device of claim 11 wherein said depressed regions are identically shaped and sized and equally spaced with respect to one another, and wherein said rough surface portions of said depressed regions become rougher as said rough surface portions lie farther from said edge surface.

13. The surface light source device of claim 11 wherein said depressed regions are identically shaped, and wherein said depressed regions become larger as said depressed regions lie farther from said edge surface, with the largest depressed regions lying adjacent to said edge surface.

14. The surface light source device of claim 11 wherein said depressed regions have an identical depth, and wherein said depressed regions have an increased diameter as said depressed regions lie farther from said edge surface.

15. The surface light source device of claim 11 wherein said depressed regions have an identical diameter, and wherein said depressed regions have an increased depth as said depressed regions lie farther from said edge surface.

16. A surface light source device comprising:

a light conducting member having a light-emitting surface disposed on one side thereof, an opposite surface disposed on a side opposite said one side, thereof, and an edge surface; and a linear light source disposed adjacent to said edge surface of said light conducting member;

wherein said opposite surface of the light conducting member comprises a plurality of discreet rough surface regions separated by smooth surface regions which are smoother in comparison with said rough surface regions.

* * * * *